(12) United States Patent
Honda et al.

(10) Patent No.: US 7,272,852 B2
(45) Date of Patent: Sep. 18, 2007

(54) RESERVE/RELEASE CONTROL METHOD

(75) Inventors: Kiyoshi Honda, Yokohama (JP); Norio Shimozono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 423 days.

(21) Appl. No.: 10/902,054

(22) Filed: Jul. 30, 2004

(65) Prior Publication Data
US 2005/0278539 A1    Dec. 15, 2005

(30) Foreign Application Priority Data
Jun. 11, 2004   (JP)  .............................. 2004-173772

(51) Int. Cl.
H04L 9/32   (2006.01)
(52) U.S. Cl. ......................... 726/10; 726/29; 711/163; 711/164
(58) Field of Classification Search ................. 726/29, 726/10; 711/164
See application file for complete search history.

(56) References Cited
U.S. PATENT DOCUMENTS

| | | | | |
|---|---|---|---|---|
| 6,052,785 | A * | 4/2000 | Lin et al. ........................ | 726/5 |
| 6,055,637 | A * | 4/2000 | Hudson et al. ................ | 726/20 |
| 6,122,631 | A * | 9/2000 | Berbec et al. .................. | 707/9 |
| 6,484,245 | B1 | 11/2002 | Sanada et al. | |
| 6,578,055 | B1 | 6/2003 | Hutchison et al. | |
| 2003/0159058 | A1* | 8/2003 | Eguchi et al. ............... | 713/193 |
| 2004/0010668 | A1 | 1/2004 | Inagaki et al. | |
| 2005/0165617 | A1* | 7/2005 | Patterson et al. .............. | 705/1 |

OTHER PUBLICATIONS

Frisch, AEleen; Essential System Administration; 2nd edition; 1995; O'Reilly & Associates, Inc.; Chapter 13.*
R, Weber., "Information Technology—SCSI Primary Commands—2(SPC-2)", Revision 20, Project T10/1236-D, ANSI NCITS, Jul. 18, 2001.

* cited by examiner

Primary Examiner—Kambiz Zand
Assistant Examiner—Jung Kim
(74) Attorney, Agent, or Firm—Mattingly, Stanger, Malur & Brundidge PC

(57) ABSTRACT

Reserve and release of a target device is managed using access permission IDs issued to a privileged device, such as a host computer. A second storage device, as the target device, is able to be shared by multiple first storage devices using the access permission IDs issued by the target device. The target device manages an access permission ID for use in identifying the access permission of other devices for accessing the target device. The target device executes processing to give as access permission to the privileged device that requests the access permission, and the target device judges whether to give access permission for access requests received after this, such as access requests from the first storage devices, according to the access permission ID originally supplied to the privileged device.

10 Claims, 17 Drawing Sheets

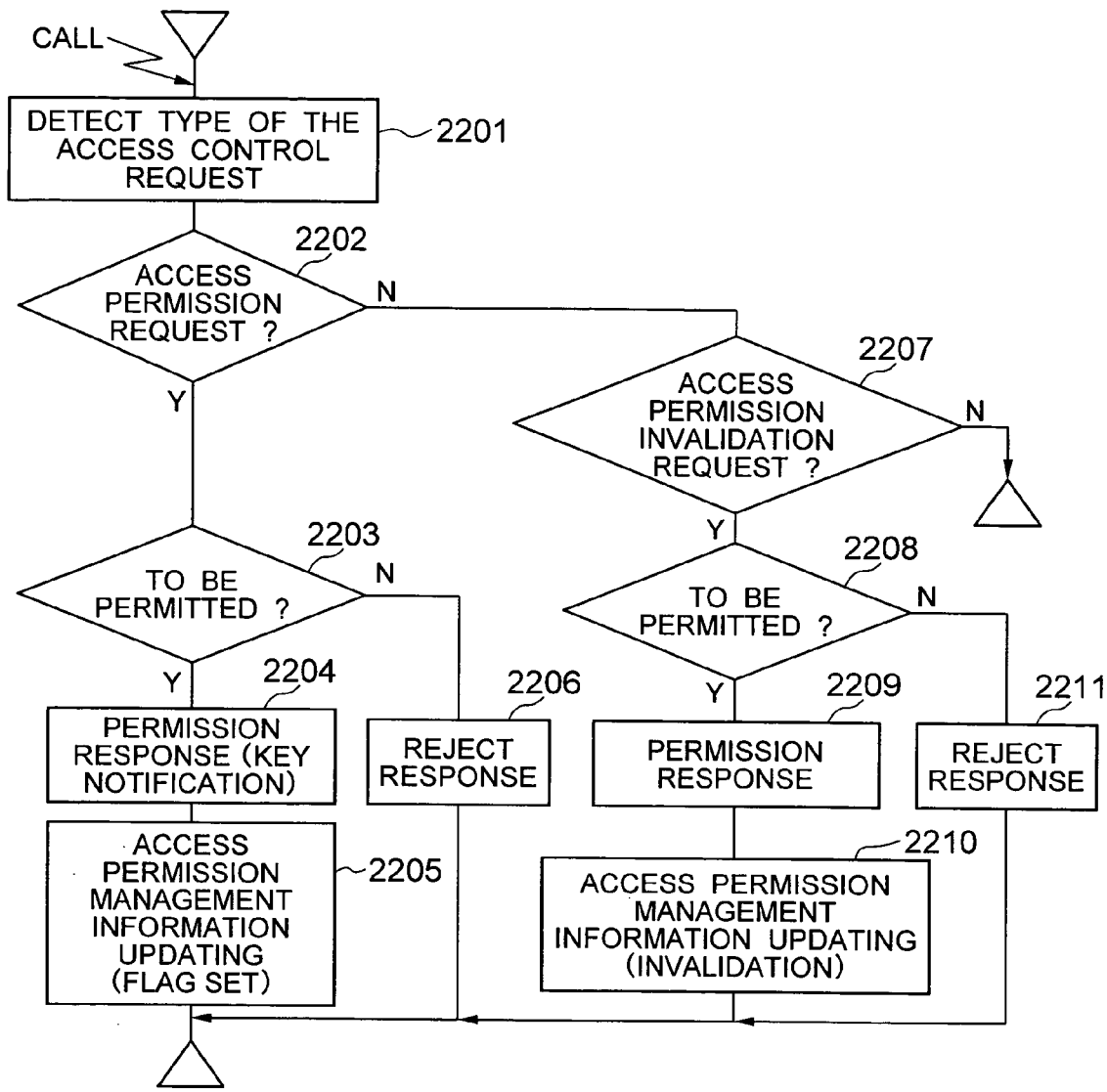

FIG. 18

| VOLUME | ACCESS PERMISSION ID | ACCESS PERMISSION DEVICE | ACCESS OBJECT DEVICE |
|---|---|---|---|
| Vol #1 | 32015691 | AS #1 | PS #1 |
| Vol #2 | 62303691 | AS #2 | PS #2 |

FIG. 20

| VOLUME | ACCESS PERMISSION ID | ACCESS PERMISSION DEVICE | ACCESS OBJECT DEVICE |
|---|---|---|---|
| Vol #1 | 32015691 | AS #1 | PS #1 |
| | 62303691 | AS #2 | PS #2 |

FIG. 23

| DEVICE | VOLUME | ACCESS PERMISSION ID | ACCESS PERMISSION DEVICE 1 |
|---|---|---|---|
| SS #1 | Vol #1 | 32015691 | AS #1 |
| | | 32906991 | AS #2 |
| | Vol #1 | 71203991 | AS #2 |
| SS #2 | Vol #1 | 62303691 | AS #2 |

RESERVE/RELEASE CONTROL METHOD

INCORPORATION BY REFERENCE

The present application claims priority from Japanese application JP 2004-173772 filed on Jun. 11, 2004, the content of which is hereby incorporated by reference into this application.

BACKGROUND OF THE INVENTION

The present invention relates to a reserve/release control method and in particular, to a reserve/release control method of a storage device permitting shared access from a plurality of devices and performing exclusive control to access from a plurality of devices and a computer system to which the method is applied.

As a method for permitting shared access from a plurality of information processing devices and realizing exclusive control of access from a plurality of information processing devices, there is known a reserve/release control method by reserve/release of the SCSI (Small Computer system Interface) command defined by the ANSI (American National Standards Institute). This is disclosed, for example, in dpANS SCSI Primary Commands—2 (SPC-2), Revision 20, 18 Jul. 2001, p 156-158.

According to this technique, when a plurality of clients share a single storage device as a target device, exclusive control is performed as follows. Firstly, a privileged client among a plurality of clients reserves the storage device and then the privileged client assigns (switches) the access permission right to another client, thereby performing exclusive control. This switching process is realized by using the third parity reservation function of the reserve command and the superseding reservation function.

SUMMARY OF THE INVENTION

In the aforementioned conventional method, i.e., in the method in which a privileged client unifies the management of the reserve/release control of the target device, access control via a privileged client is always required. That is, reserve/release control is required. Accordingly, when a plurality of clients share a single storage device as a target, processing of switching access permission right by the privileged client is required, which increases the protocol overhead.

Moreover, in the aforementioned conventional technique, one privileged client is assumed, and no consideration is taken when a plurality of privileged clients are present. For example, when two privileged clients A and B are present and the privilege client A reserves the target device, the privileged client B should waits for release of the target by the privileged client A or cooperation between the privileged clients A and B is required.

Furthermore, in the aforementioned conventional technique, reserve/release control is performed by using only the device identification information and there is a danger that an unauthorized access is easily performed and prevention of an unauthorized access to the target device cannot be expected. Furthermore, in the aforementioned conventional technique, only one client can access the target device at a time. This seriarizes the access to the target device and there arises a problem that the performance limit is low.

In order to solve the aforementioned problems, there is provided as an embodiment of the present invention, a reserve/release control method for a target device accessed by at least one upper level device, the method comprising steps of: managing an access permission ID for identifying the access permission to a local device; transmitting the access permission ID to a host computer when permitting an access permission request from the host computer; and judging the access permission by using the access permission ID added in association with the access request for the access request from the upper level device.

Moreover, the target device may be a storage device accessed from a plurality of host computers and the storage device manages a plurality of access permission ID's, and the target device gives different access permission ID's to the plurality of access permission request from the host computer and transmits them to the host computer.

Furthermore, the target device may update the access permission ID in the target device. For example, the access permission ID held by the local device is updated when a request for invalidating the access permission ID is received from the host computer for which the access permission request has been permitted.

Moreover, the host computer issues an access permission request to the target device prior to issuing an access request to the target device and acquires an access permission ID which is added by the target device when permitting the access permission request.

Furthermore, the host computer may issue an access request added by the access permission ID acquired in advance when the host computer issues an access request to one of the storage devices.

Moreover, there is provided a system including a plurality of first storage devices such as primary storage functioning as clients and executing an access request received from the host computer as a upper level device, and a secondary storage device such as a secondary storage functioning as the target device, wherein the host computer may issue a copy command added by the access permission ID acquired from the second storage device to the first storage device; and the first storage device may execute the copy command and transmit the data stored in the first storage device to the second storage device for which access is permitted by the access permission ID.

Moreover, there is provided as an embodiment, a computer system comprising; a first device; a second device, and a host computer, wherein the host computer issues an access permission request to the second device prior to issuing an access request to the first device and issues an access request to the first device by using an access permission ID for identifying the access permission acquired when the access permission request is permitted; wherein the second device manages the access permission ID for identifying the access permission to the second device and, when permitting the access permission request from the host computer, gives the access permission ID to the host computer and judges the access permission by using the access permission ID associated with the access request for the access request from the host computer, and wherein the first device executes the process for the second device according to the access request from the upper level device.

It should be noted that the system may include a management device connected to the network and the management device executes registration, deletion, and updating of the access permission ID managed by the second device.

Other objects, features and advantages of the invention will become apparent from the following description of the embodiments of the invention taken in conjunction with the accompanying drawings.

BRIEF DESCRIPTION OF THE DRAWINGS

FIG. 12 shows an example of processing of the access permission control program executed in the second storage device 2.

FIG. 13 shows an example of access permission management information held/managed by the second storage device 2.

FIG. 18 shows an example of access permission management information managed in the second storage device 2 in the second embodiment.

FIG. 20 shows an example of access permission management information managed by the second storage device 2 in the second embodiment.

FIG. 23 shows an example of access permission management information held/managed by the management device in the third embodiment.

DETAILED DESCRIPTION OF THE EMBODIMENTS

Description will now be directed to embodiments of the present invention with reference to the attached drawings.

Figure 1:
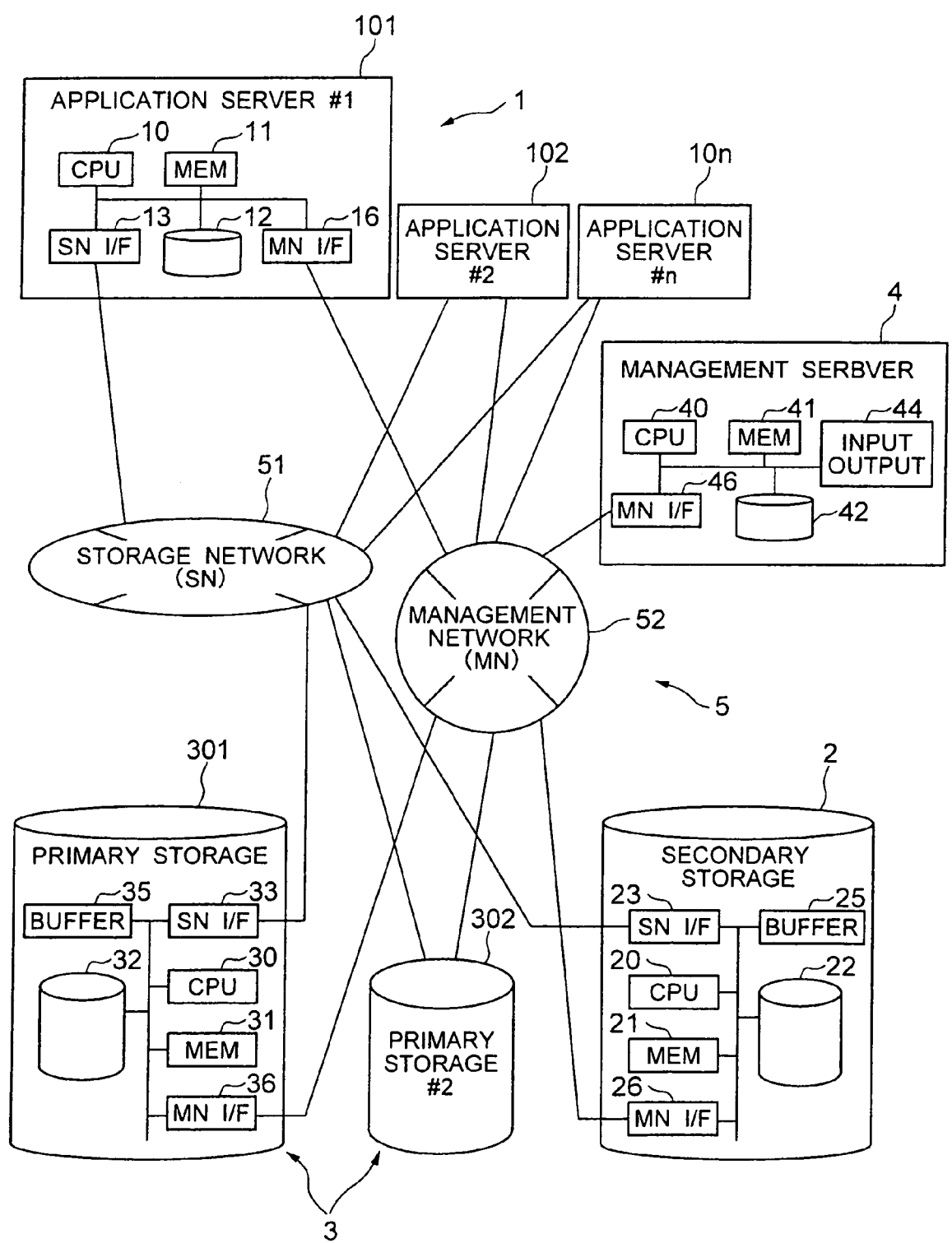
FIG. 1 is a block diagram showing a configuration example of a computer system.

The first embodiment will be described with reference to FIG. 1 to FIG. 16. FIG. 1 is a block diagram showing a system configuration of the computer system to according to the first embodiment.

In FIG. 1, a reference symbol 1 denotes a plurality of host computers (application servers in the drawing) executing an arbitrary application program; 3 denotes a first storage device (primary storage in the drawings) for storing data to be accessed by the application program; 2 denotes a second storage device (secondary storage in the drawing) for storing some or all of the copies stored in the first storage device 3; and 4 denotes a management device (management server inn the drawing) executing management of the computer system. It should be noted that the respective host computers are denoted by 101 to 10n and the respective storage devices of the first storage device 3 are denoted by 301 to 302. The plurality of host computers 1, the plurality of first storage device 3, and the second storage device 2 are connected to one another by a data network (storage network (SN) in the drawing) 51. Moreover, the plurality of host computers 1, the plurality of first storage devices 3, the second storage device 2, and the management device 4 are connected to one another via a management network (management network (MN) in the drawing) 52.

Here, the networks 51 and 52 connecting the host computers 1, the first storage devices 3, the second storage device 2, and the management device 4 can use an arbitrary communication protocol for each of the communication objects. Moreover, physically, it is possible to connect the communication objects by divided networks or a unified network.

Furthermore, the host computers, the first storage devices 3, the second storage device 2, and the management device 4 have ports (SN I/F, MN I/F in the drawing) for the data network 51 and the management network 52. However, the present embodiment is not limited to this. For example, the plurality of ports SN I/F and MN I/F may be realized by a single port. It should be noted that in the explanation below, the data network 51 and the management network 52 are not distinguished from one another and explained as a network 5.

Each of the host computers 1 includes a CPU 10 executing an application program, a memory 11 for storing the application program, a recording medium 12 such as a hard disc device, a port (SN I/F in the drawings) 13 connected to the network 5 for transmitting/receiving data, and port (MN I/F) 16.

The management device 4 manages reserve/release control for the second storage device 2 according to an instruction from the system administrator and includes an I/O device 44, a CPU 40 executing a management program, a memory 41 for storing the management program, a recording medium 42 such as a hard disc device, and a port (MN I/F in the drawing) 46 connected to the network 5 for transmitting/receiving the management information.

The first storage device 3 includes a port (SN I/F in the drawing) 33 connected to the network 5 for transmitting/receiving data, a port (MN I/F in the drawing) 36, a recording medium 32 for storing data used by the application program of the host computer 1, a buffer section 35 for storing data transmitted between the port 33 and the recording medium 32, a CPU 30 for overall controlling the aforementioned series of data transmission processing, and a memory (MEM in the drawing) 31.

The second storage device 2 includes a port (SN I/F in the drawing) 23 connected to the network 5 for transmitting/receiving data, a port (MN I/F in the drawing) 26, a recording medium 22 for storing some or all of the copy data stored in the first storage device 3, a buffer section 25 for storing data transmitted between the port 23 and the recording medium 22, a CPU 20 for overall controlling the aforementioned series of data transmission processing, and a memory (MEM in the drawing) 21.

Here, the recording medium 32, 22 of the first storage device 3 and the second storage device 2, respectively, are preferably disc devices of RAID (Redundant Arrays of Inexpensive Disks) configuration. However, the recording medium is not limited to this and may be a single hard disc device. In the case of the RAID configuration, it is preferable that the first storage device 3 and the second storage device 2 have a disc interface control section (not shown) for transmitting data between the respective disc devices (recording mediums 32, 22) and the buffer section 35, 25, and be connected to a disc device group (not shown) via a plurality of disc interface control sections (not shown).

In the explanation given below on this embodiment, the reserve/release control method will be explained by assuming the backup processing as an application executed by the host computer 1 and a case that the host computer 1 copies data from the first storage device 301, 302 to the second storage device 2 by using the copy command, i.e., the second storage device 2 accepts a write access request from a plurality of first storage devices 3.

It should be noted that the copy command is issued from the host computer 1 to the first storage device 3 so that the first storage device 3 directly transmits data (i.e., write processing) to the second storage device 2. For example, this commands corresponds to the Extended Copy command defined by the ANSI T10. This is called server-less backup.

Figure 2:
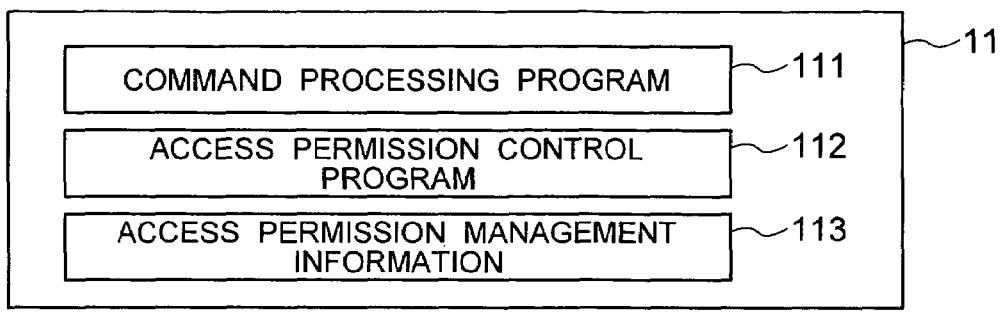
FIG. 2 shows an example of a program and management information stored in a recording medium of a host computer 1.

FIG. 2 shows an example of a program and management information which are stored in the recording medium 12 of the host computer 1 and read into the memory 11 so as to be executed by the CPU 10. In FIG. 2, only those directly associated with the explanation of the present embodiment are shown and the initialization program and application program executed in the host computer 1 are omitted. Similarly in the explanation of FIG. 3 to FIG. 5, the initialization program is omitted. However, actually, each device have the initialization program and executes initialization (such as zero clear) of each setting information upon power ON.

In FIG. 2, according to a data access request from an application program, the command processing program 111 generates and issues an access request (command) for the first storage device 3 and transmits data accompanying the access request. Furthermore, according to the end report from the first storage device 3, the command processing program 111 reports the data access processing result to the application of the host computer 1.

Moreover, the access permission control program 112 is a program executed before the access request (command) is issued to the first storage device 3 and executes access permission control processing for the second storage device. According to the result of this processing, the access permission management information 113 is updated, invalidated, registered, and the like. It should be noted that the command processing program 111, the access permission control program 112, and the access permission management information 113 will be detailed later.

Figure 3:
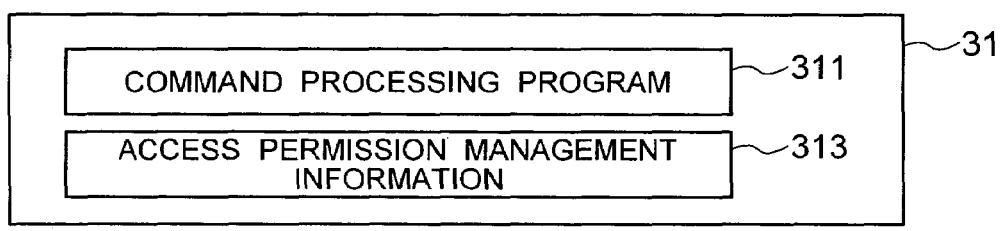
FIG. 3 shows an example of a program and management information stored in a recording medium of a first storage device 3.

FIG. 3 shows an example of a program and management information which are read into the memory 31 of the first storage device 3 and executed by the CPU 30. In FIG. 3, the command processing program 311 is a program for processing a command (data access request) from the host computer 1. Moreover, the access permission management information 313 is management information used when the first storage device 3 issues a command to the second storage device 2. It should be noted that the command processing program 311 and the access permission management information 313 will be detailed later.

Figure 4:
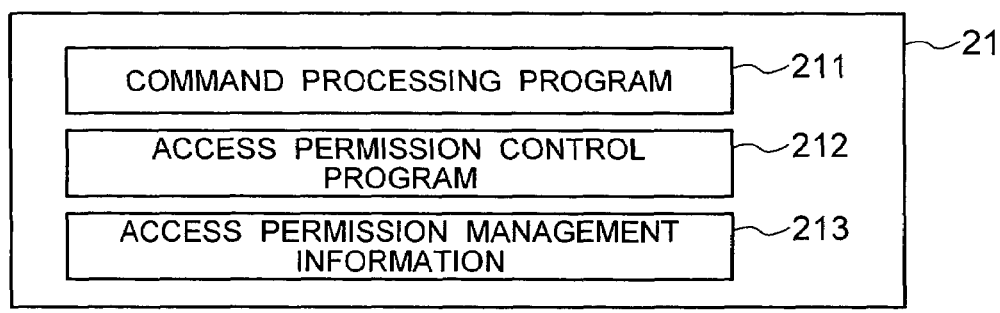
FIG. 4 shows an example of a program and management information stored in a recording medium of a second storage device 2.

FIG. 4 shows an example of a program and management information which are read into the memory 21 of the second storage device 2 and executed by the CPU 20. In FIG. 4, the command processing program 211 is a program for processing a command (data access request) from the first storage device 3. Moreover, the access permission control program 212 is a program executed prior to processing of the command (data access request) from the first storage device 3 and executes access permission control processing to/from the host computer 1 and update of the access permission management information 213 according to the processing result. It should be noted that the command processing program 211, the access permission control program 212, and the access permission management information 213 will be detailed later.

Figure 5:
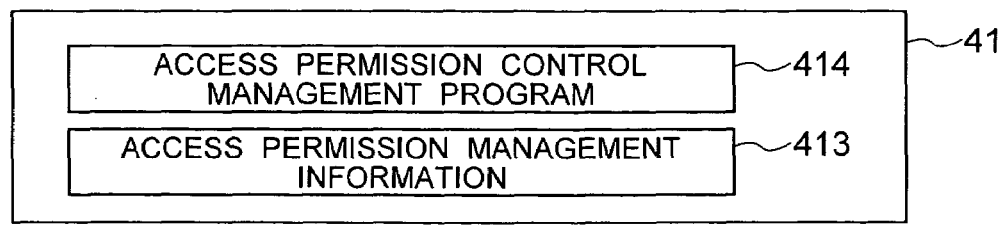
FIG. 5 shows an example of a program and management information stored in a recording medium of a management device 4.

FIG. 5 shows an example of a program and management information which are stored in a recording medium 42 of the management device 4 and read into the memory 41 so as to be executed by the CPU 40. In FIG. 5, the access permission control management program 414 is a program for initializing and updating the access permission management information 213 held in the second storage device 2. For example, the access permission control management program 414 holds management information set via the I/O device 44 from the system administrator as access permission management information 413 and issues it to the second storage device 2.

Figure 6:
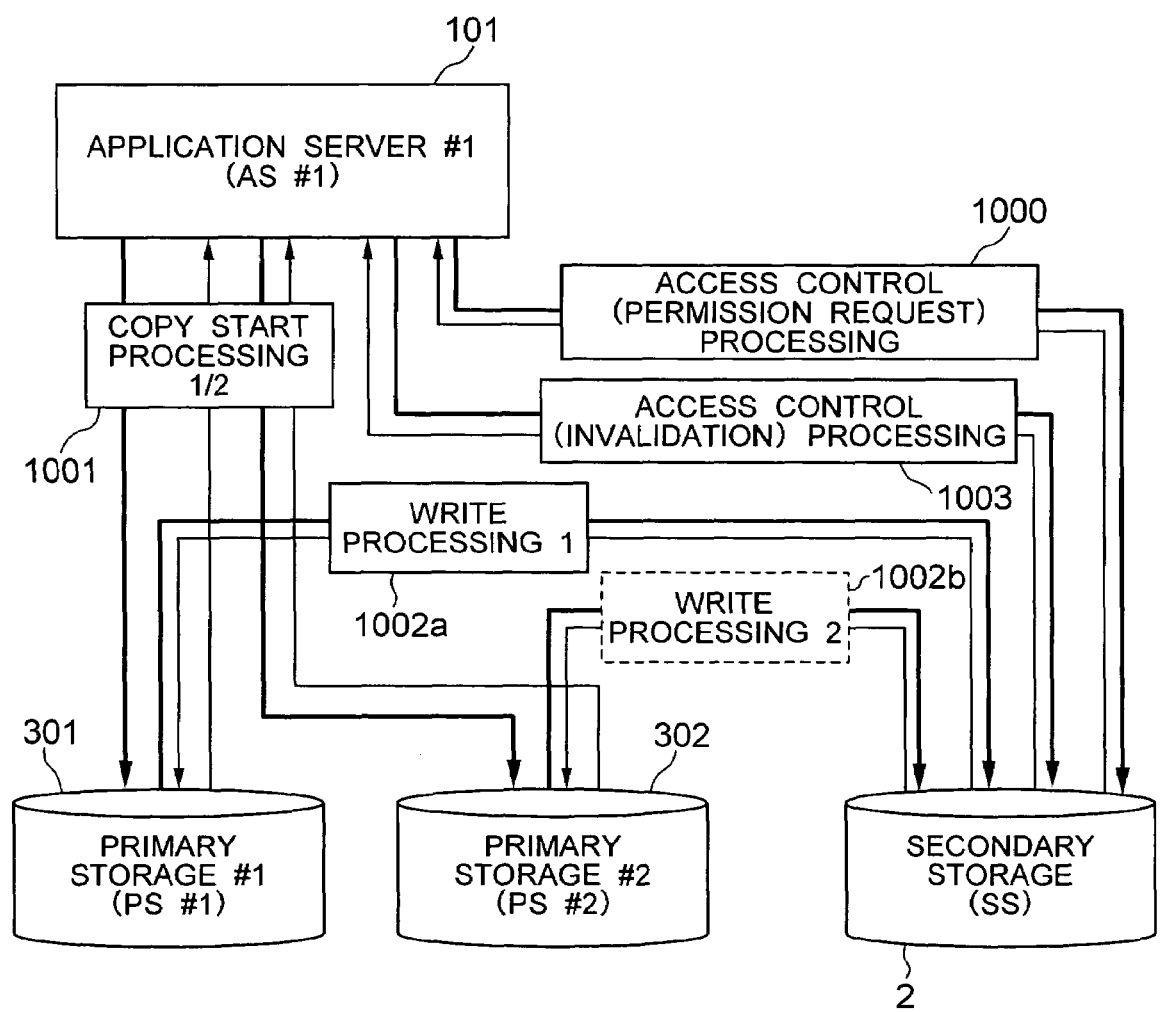
FIG. 6 shows an outline of reserve/release control, processing in a first embodiment.

FIG. 6 shows an outline of the reserve/release control processing in the first embodiment. In FIG. 6, the host computer 1 (such as a host computer 101) executes access control (permission request) processing (1000) requesting access permission ID to the second storage device 2 before starting the processing to copy data in the second storage device 2 from the first storage devices 301, 302 by using the copy command. The host computer 1 which has acquired access permission to the second storage device 2 issues the copy command added by the access permission information acquired from the second storage device 2, to the first storage device 301, thereby executing the copy start processing 1 (1001).

The first storage device 301 which has received this copy command generates and issues a write command to the second storage device 2 according to the various information constituting the copy command, thereby executing the write processing 1 (1002a). Upon termination of the write processing 1, the end of the copy command is reported to the host computer 1. It should be noted that the aforementioned various information constituting the copy command includes, for example, copy source and copy destination address information, copy data amount, data type, and the like.

The host computer 1 which has received the copy command end report from the first storage device 301 issues, like the copy start processing 1, a copy command added by the access permission information acquired from the second storage device 2, to the first storage device 302, thereby executing the copy start processing 2. The first storage device 302 receives this copy command and generates and issues a write command for the second storage device 2 according to various information constituting the copy command, thereby executing the write processing 2 (1002-b). Upon termination of the write processing 2, the end of the copy command is reported to the host computer 1.

The host computer 1 detects the completion of the data copy (write) processing to the second storage device 2 from the first storage devices 301, 302 and executes access control (invalidation) processing (1003) requesting the second storage device 2 to invalidate the access permission ID acquired previously. By the aforementioned processes, the reserve/release control can be performed when the data write access is generated for the second storage device 2 from a plurality of first storage devices 3.

Next, explanation will be given on the aforementioned access control (permission request, invalidation) processing, copy start processing, write processing, access control (invalidation) processing.

Figure 7:
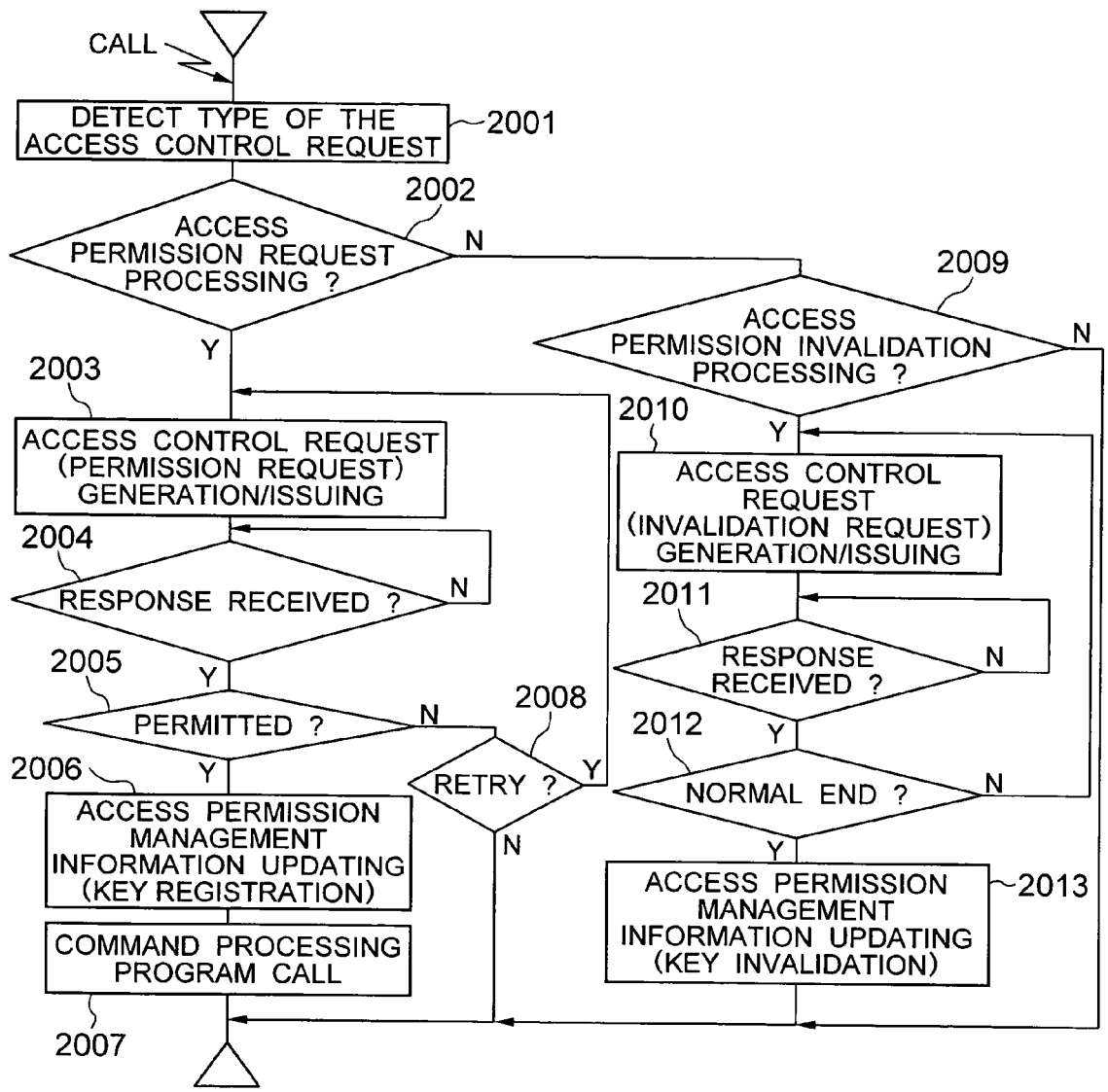
FIG. 7 is a flowchart showing an example of processing of an access permission control program 112 executed in the host computer 1.

FIG. 7 shows an example of processing of the access permission control program 112 executed in the host computer 1. The access permission control program 112 is a program which is executed upon call from the application program requiring access permission control for the second storage device 2 and the type of the access control request is detected from the information constituting the call (2001). Here, the access request type may be a read request, a write request, an access permission request, a copy start request, an access invalidation request, and the like.

When the access control request type is processing of an access permission request (2002), the access permission control program 112 generates and issues an access control request requesting the second storage device 2 to issue an access permission (2003), after which it waits for a response from the second storage device 2.

If the second storage device 2 responds an access permission (2005), the access permission ID added to the access permission response is registered in the access permission management information 113 held by the local device and update is performed (2006). Furthermore, by adding this access permission ID for calling the command processing program 111 (2007), the series of processes is complete.

On the other hand, in step 2005, if the response from the second storage device 2 is not the access permission, in this example, it is judged whether to retry generation and issuance of the access control request for requesting the second storage device 2 to issue an access permission (2008). As a result, if it is judged to perform retry, the retry of step 2003 and after is executed. If it is judged not to perform retry, the series of processes is complete, thereby realizing the access control (permission request) processing (1000) to the second storage device 2.

On the other hand, if the type of the access control request in step 2002 is access permission invalidation processing (2009), the access permission control program 112 generates and issues an access control request for requesting invalidation of the access permission to the second storage device 2 (2010) and waits a response from the second storage device 2 (2011).

If the response from the second storage device 2 is a normal end (2012), update processing is executed by deleting the access permission ID of the access permission management information 113 held and managed by the local device (2013). Thus, a series of processes is complete. Moreover, in step 2012, if the response from the second storage device 2 is not a normal end, in this example, the operation of step 2010 and after is re-executed for retrying the generation and issuance of the access control request requesting the second storage device 2 to invalidate the access permission. It should be noted that when the type of the access control request is other than the aforementioned, the series of processes is complete.

Figure 8:
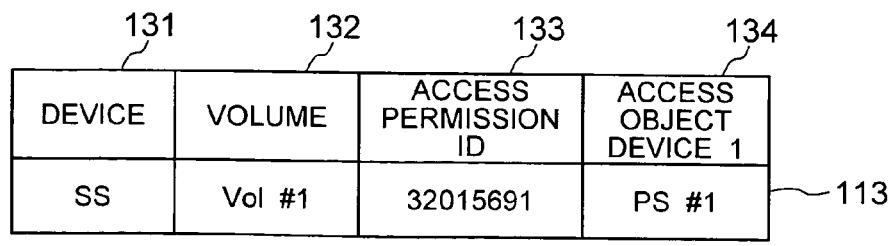
FIG. 8 shows an example of access permission management information 113 held/managed by the host computer 1.

FIG. 8 shows an example of access permission management information 113 held/managed by the host computer 1. In FIG. 8, the access permission management information 113 includes a device ID 131 for identifying a device (i.e., a second storage device) to be access-permission-controlled, a volume ID 132 for identifying a volume, an access permission ID 133 to be notified when access is permitted, and an access object device ID 134 for identifying a device which has issues an access request to the second storage device 2.

In the example of FIG. 8, the host computer 1 acquires "32015691 as the access permission ID for the volume identified by Vol#1 of the device identified by SS and issues an access request for the second storage device 2 to the device identified by PS#1.

Figure 9:
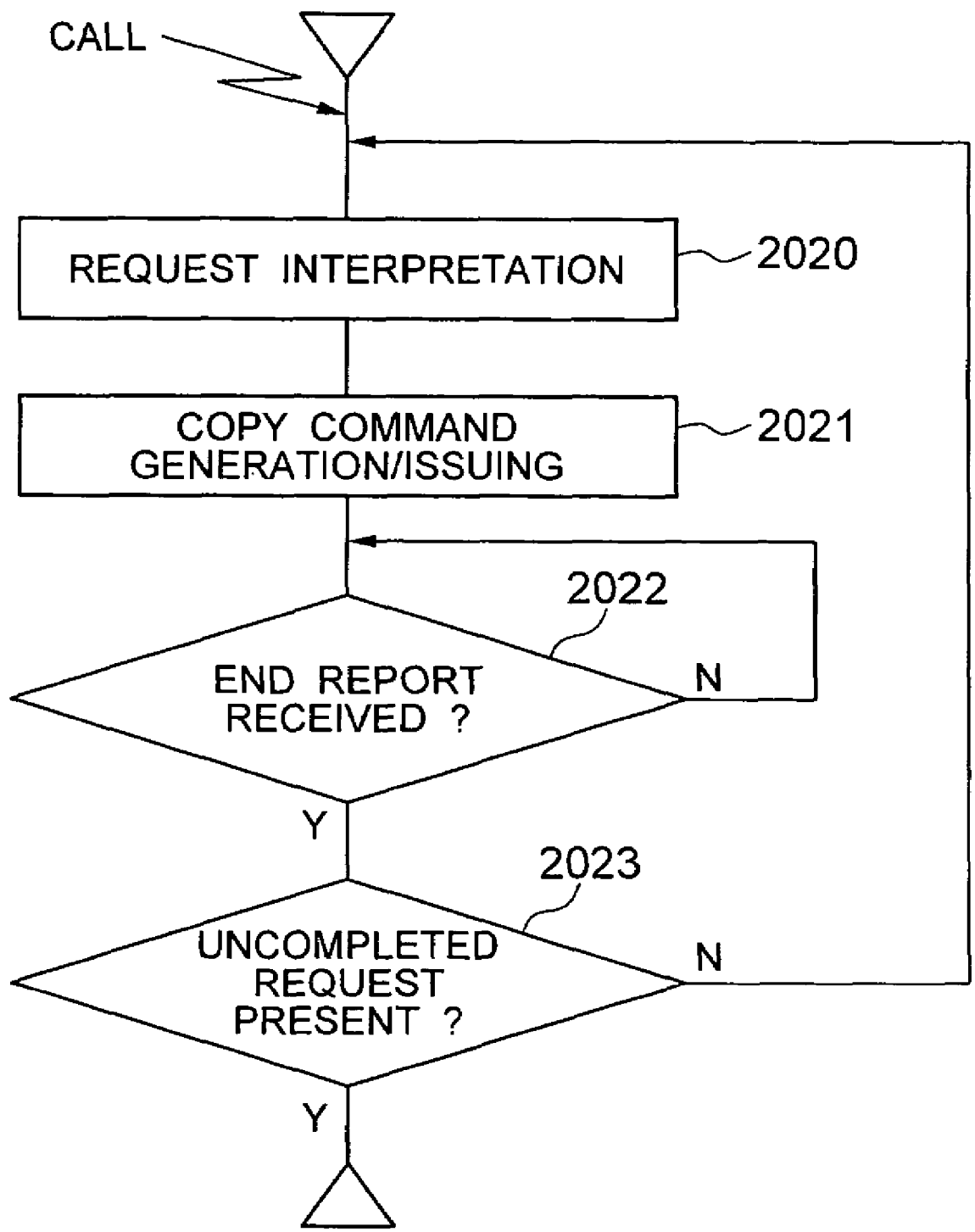
FIG. 9 shows an example of processing of a command processing program executed in the host computer 1.

FIG. 9 shows an example of processing of a command processing program 111 executed in the host computer 1. Hereinafter, explanation will be given on an example of issuing a copy command associated with the backup processing in the present embodiment.

The command processing program 111 is a program which is executed upon a call from the access permission control program 112. The command processing program 111 called from the access permission control program 112 interprets that copy processing is requested from the information constituting the call (2020) and further generates and issues a copy command for the first storage device 3. Here, this copy command is added by the access permission ID acquired from the second storage device 2.

Subsequently, the command processing program 111 waits for the end report from the first storage device 3. The command processing program 111 detects whether an uncompleted request is present (2023). If there is any, the uncompleted request ex re-executed from step 2020. If there is none, the series of processes is terminated.

Figure 10:
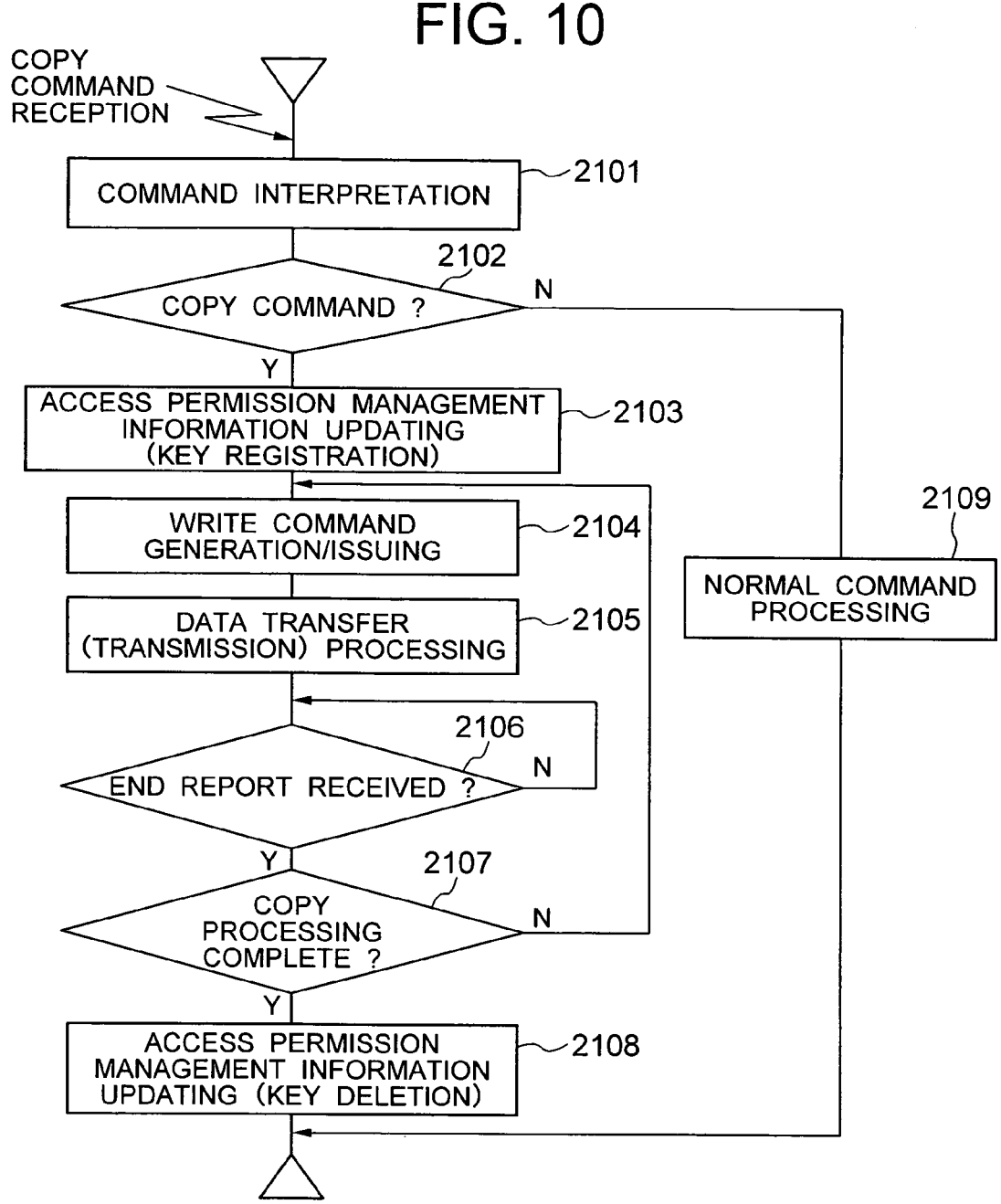
FIG. 10 shows an example of processing of the command processing program executed in a first storage device 3.

FIG. 10 is an example of processing of a command processing program 311 executed in the first storage device 3. Hereinafter, explanation will be given on an example of data write processing accompanying the copy command reception in this embodiment.

The command processing program 311 is a program executed upon reception of a command issued from the command processing program 111 of the host computer 1. The command processing program 311 which has received a command issued from the host computer 1 interprets the received command (2101) and judges whether it is a copy command (2102). If the judgment results in that the command is other than the copy command, a normal command processing is performed (2109) and the series of processes is terminated.

On the other hand, if the judgment results in that the command is a copy command, the access permission ID added to the received copy command is registered in the access permission management information 313 held/managed by the local device and further a write command for the second storage device 2 is generate d and issued (2104). Subsequently, the local device performs data transmission to/from the second storage device 2 (2105) and waits for the end report from the second storage device (2) (2106).

Upon the termination of the write processing, it is judged whether the copy processing request from the host computer 1 is complete. If not complete, step 2104 and after are re-executed. If complete, control is passed to step 2108 where the access permission ID registered in the access permission management information 313 is deleted and the series of processes is terminated.

Figure 11:
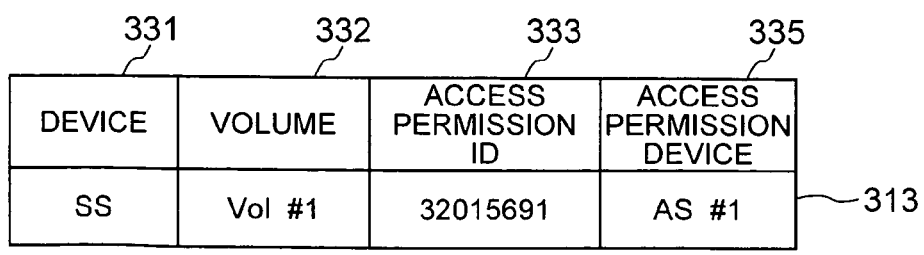
FIG. 11 shows an example of access permission management information held/managed by the first storage device 3.

FIG. 11 shows an example of the access permission management information 313 held/managed by the first storage device 3. In FIG. 11, the access permission management information 313 includes a device ID 331 for identifying a device to be access-permission-controlled (i.e., a second storage device), a volume ID 332 for identifying a volume, an access permission ID 333 reported when access is permitted, and an access permission device ID 335 for identifying the device which has reported the access permission ID to the first storage device 3.

In the example of FIG. 11, the host computer 1 identified by AS#1 notifies "32015691" as the access permission ID for the volume identified by Vol#1 of the device identified by SS, to the first storage device 3.

FIG. 12 shows an example of processing of the access permission control program 212 executed in the second storage device 2. The access permission control program 212 is a program executed upon reception of an access control request from the host computer 1 and detects the type of the access control request from the information constituting the access control request (2201).

When the type of the access control request is an access permission request (2202), the access permission control program 2112 judges whether to permit access (2203). If the access is to be permitted, the access permission control program 212 returns a permission response having an access permission ID (2204) and updates (registers) the access permission management information 213 held/managed by it (2205), thereby terminating the series of processes. On the other hand, if the access is not to be permitted, a rejection response is returned, thereby terminating the series of processes (2206).

Moreover, when the type of the access control request is an invalidation request (2207), the access permission control program 212 judges whether to permit invalidation (2208). If the invalidation is judged to be permitted, a permission response is returned (2209) and the program updates (invalidates) the access permission management information 213 held/managed by it, thereby terminating the series of processes. On the other hand, when invalidation is not to be permitted, a rejection response is returned, thereby terminating the series of processes (2211). It should be noted that the judgment method how to judge whether to permit the access will be detailed later.

FIG. 13 is an example of the access permission management information 213 held/managed by the second storage device 2. In FIG. 13, the access permission management information 213 includes a volume ID 232 for identifying the volume to be access-permission-controlled, an access permission ID 233 notified when the access is permitted, an access object device ID 234 registered as a device to be accessed, and an access permission device ID 235 which has notified the access permission.

In the example of FIG. 13, "32015691" is set as an access permission ID for the volume identified by Vol#1 of the second storage device 2 and this access permission ID 233 is notified to the device identified by AS#1. Furthermore, access is made from the device identified by PS#1.

It should be noted that although detailed explanation is omitted, this access permission management information 213 can be registered and updated by the system administrator by executing the access permission control management program 414 of the management device 4 and upon access control processing from the host computer 1, the access object device ID 234 and the access permission device ID 235 are updated. Furthermore, it is preferable that the access permission ID 233 be updated upon an arbitrary condition.

Figure 14:
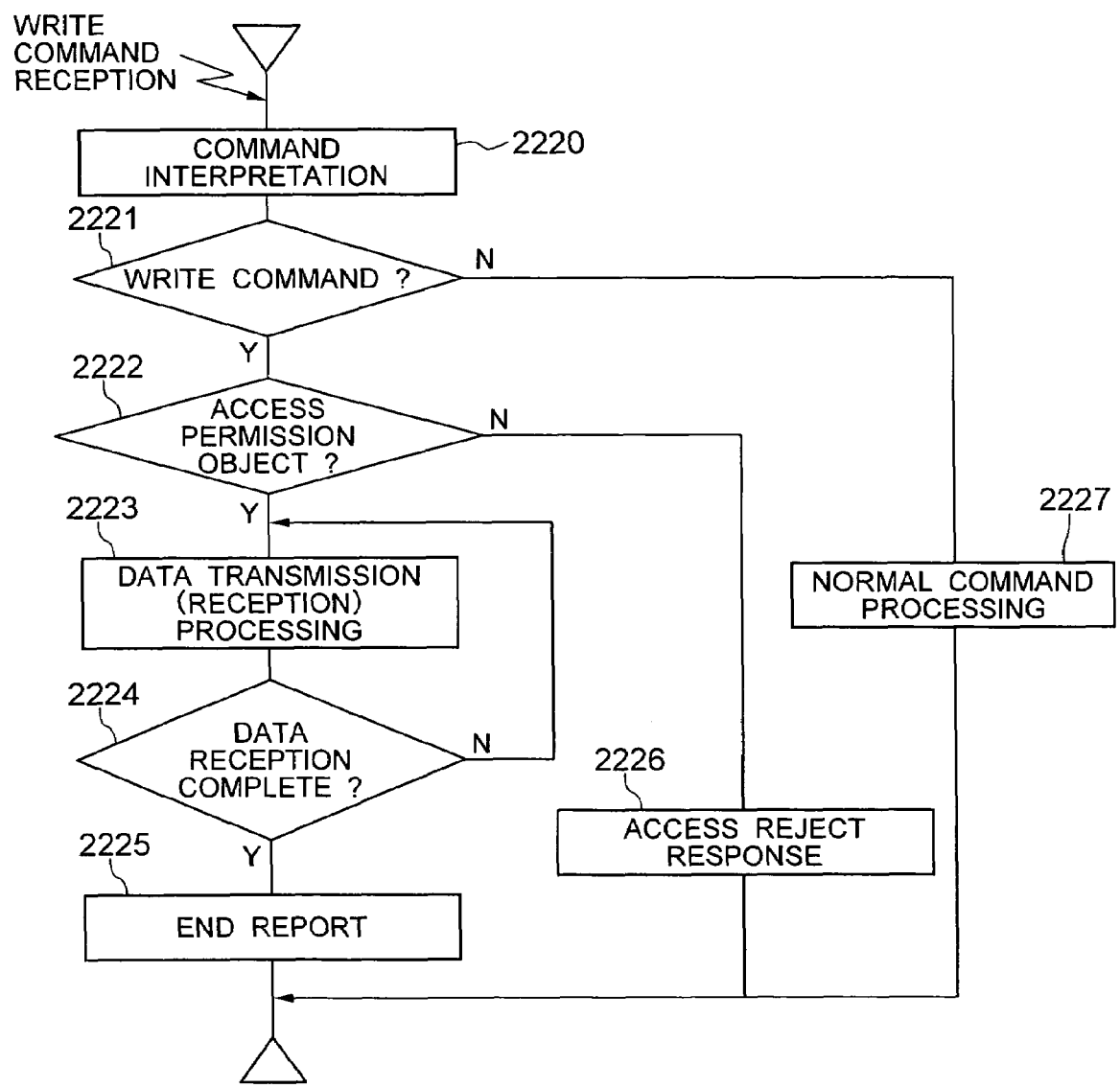
FIG. 14 shows an example of processing of the command processing program executed in the second storage device 2.

FIG. 14 is an example of the command processing program 211 executed in the second storage device 2. Hereinafter, explanation will be given on an example of data write processing associated with the backup processing in the embodiment.

The command processing program 211 is a program executed upon reception of a command, performs interpretation of the received command (2220) and judges whether the received command is a write command (2221). If the judgment results in that the command is other than the write command, a normal command processing is executed (2227), thereby terminating the series of processes. It should be noted that the ordinary command here means a command processing which can be executed without performing the reserve/release control in this embodiment.

When the judgment in step 2221 results in that the command is a write command, judgment is made whether the access request source is an object for which access has been permitted (2222). This judgment processing can be performed on the condition whether the ID of the device which has issued the write command is registered in the access object device ID 234 of the access permission management information 213 and further whether the write command has the access permission ID issued by the device itself.

When the judgment in step 2222 results in that the access request source is not an object for which access is permitted, an access rejection response is returned to the write command (2226), thereby terminating the series of processes.

On the other hand, if the aforementioned judgment results in that the access request source is an object for which access is permitted, data transmission to/from the write command issuing source device (i.e., reception in the second storage device 2) is executed (2223). After waiting for the completion of data reception (2224), the end report is performed upon completion of the data reception (2225) and the series of processes is terminated. Here, the processing of FIG. 14 is not limited to the write command but it is performed in the same way for the other commands. It should be noted that in the second storage device, when a command added by the access permission ID is received, the information is set in itself by assuming that the transmission source device is a device for which access is permitted.

Figure 15:
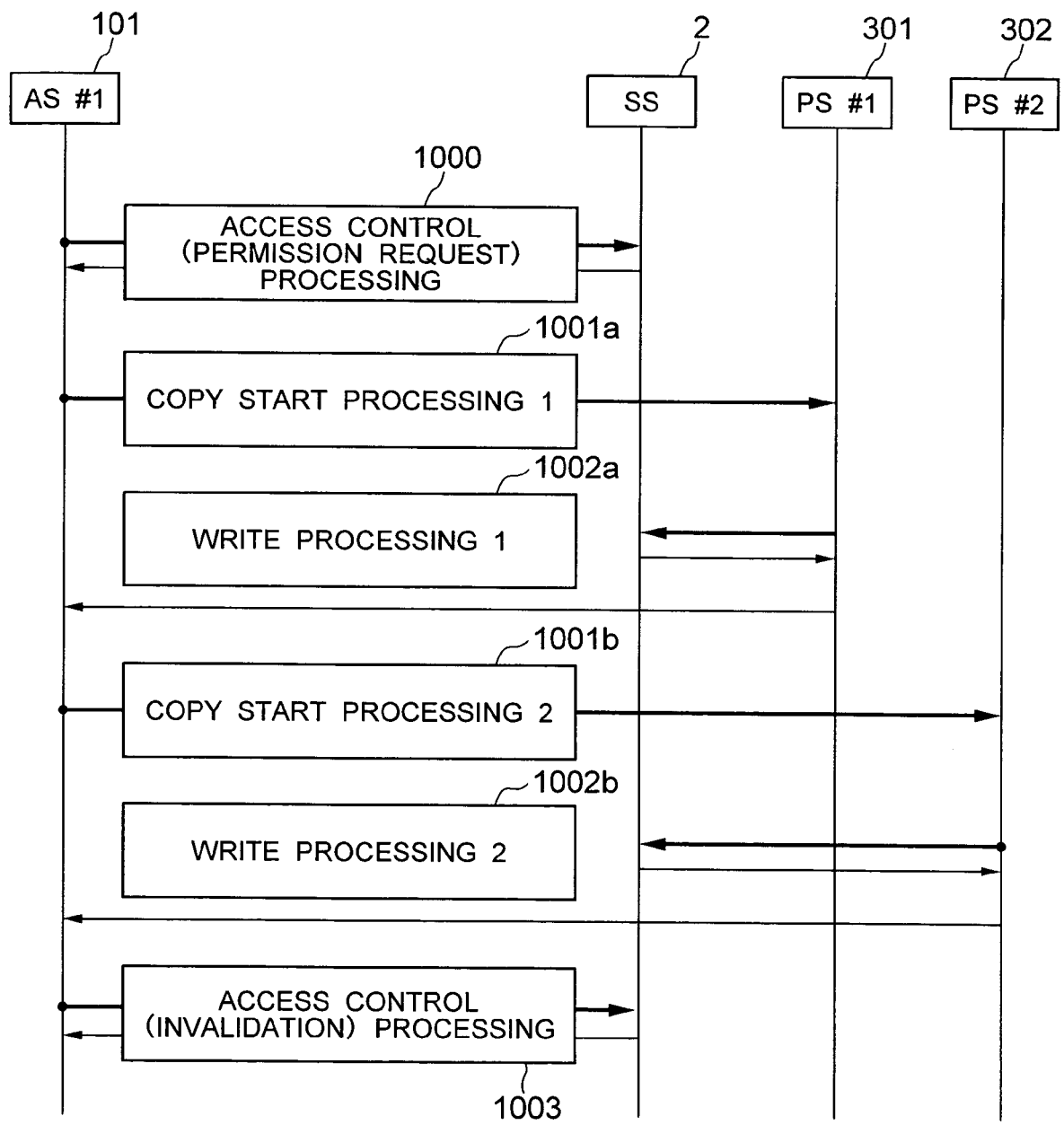
FIG. 15 shows relationship between devices associated with the access control processing and an example of procedure in the first embodiment.

FIG. 15 shows a relationship between devices and procedure for the series of processes for executing the access control processing in this embodiment, i.e., access control (permission request) process 1000, copy start process 1001, write process 1002, and access control (invalidation) process 1003.

As can be seen from FIG. 15, the series of access control (permission request/invalidation) processes 1000-1003 are executed upon start/end of the reserve/release control for the second storage device 2 between the host computer 1 and the second storage device 2. Moreover, the copy start process 1001 is issued from the host computer 1 to the first storage device 3 and the write process 1002 is executed between the first storage device 3 and the second storage device 2.

By executing the access control process like this, the reserve/release control is performed when the host computer 1 copies the data in the first storage devices 301, 302 from the first storage devices 301, 302 to the second storage device 2 by using the copy command. That is, it is possible to realize the reserve/release control in the second storage device 2 when the write access request from a plurality of first storage devices 3 is received by the second storage device 2.

Furthermore, in the aforementioned processing, even when the access object device for the second storage device 2 is changed from the first storage device 301 to the first storage device 302, the host computer 1 can easily perform the processing by adding the access permission ID acquired from the second storage device 2 to the access (copy) request. Accordingly, unlike the conventional method, there is no need of modifying the access permission right between the host computer 1 and the second storage device 2, thereby reducing the protocol overhead.

Furthermore, in the second storage device 2 which has received the write command from the first storage device 3, improvement of reliability for data access can be expected by judging the access permission by using the device ID of the access request source and the access permission ID and further by updating the access permission ID upon an arbitrary condition.

It should be noted that in the explanation above, the first embodiment is explained by using an example in which the application executed by the host computer 1 is a backup processing. However, the present invention is not limited to this. In general, the reserve/release control method of the present invention can be applied to an environment where a single storage device is shared by a plurality of clients.

Moreover, in the aforementioned embodiment, explanation is given on a case where the single host computer 1 executes an access permission control process for the second storage device 2 (no concurrence present). However, the present invention is not limited to this. For example, the reserve/release control method of the present invention can also be applied to a case when a plurality of host computers 1 execute access control process to the second storage device 2 (concurrence present).

Figure 16:
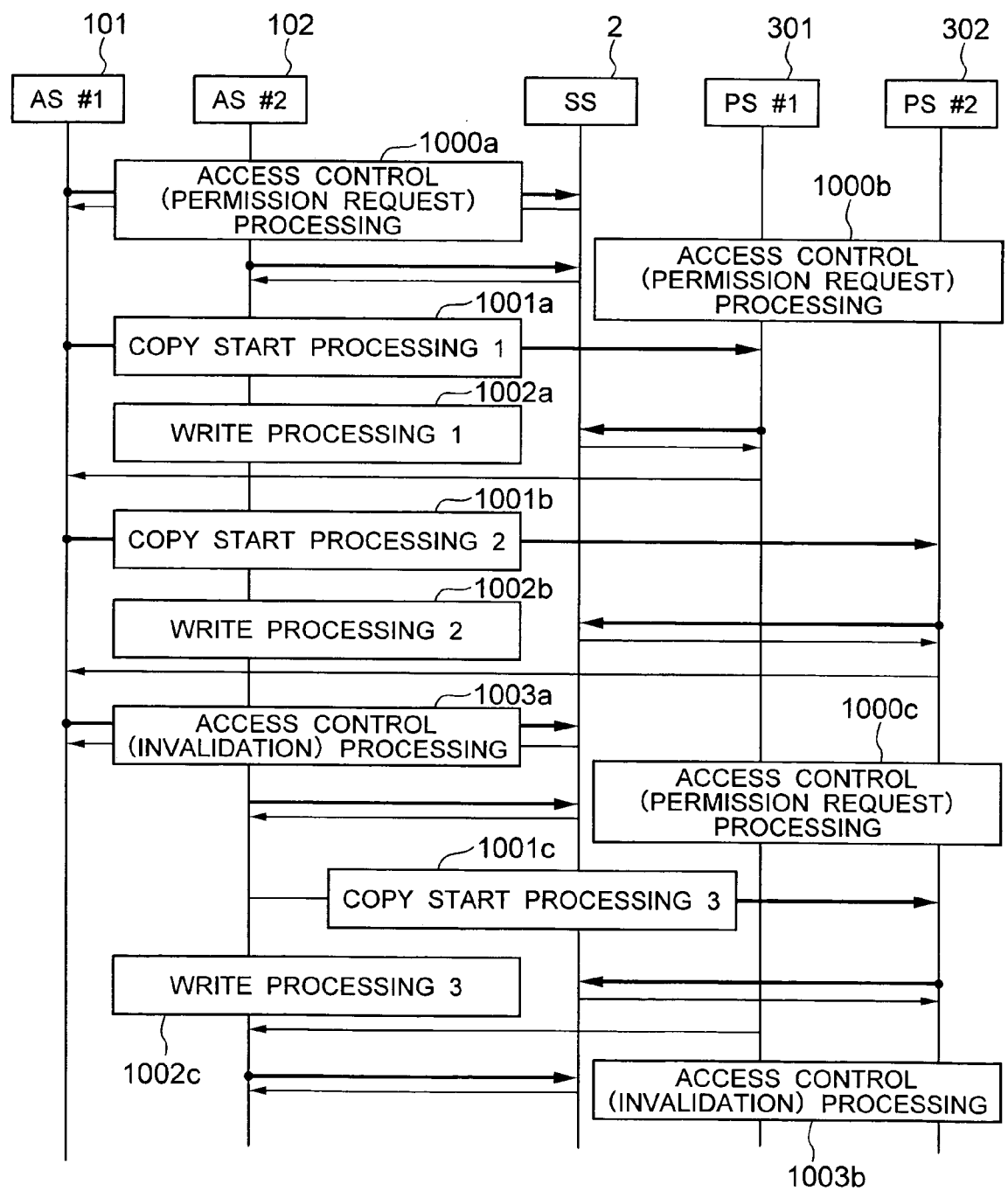
FIG. 16 shows relationship between devices associated with the access control processing and an example of procedure in an alternative example.

FIG. 16 shows a procedure of access control process in an alternative example. This example shows a series of processes for executing an access control process when a plurality of host computers 1 execute access control process to the second storage device 2 (concurrence present). That is, FIG. 16 shows the relationship between devices and processes for the access control (permission request) process 1000, a copy start process 1001, a write process 1002, and an access control (invalidation) process 1003.

As compared to the aforementioned example of FIG. 15, a host computer 102 (AS#2 in the figure) is added and unlike FIG. 15, the access control process is executed from the host computer 102 to the second storage device 2.

In FIG. 16, the access control (permission request) process 1000a is executed between the host computer 101 and the second storage device 2. The second storage device 2 gives the access permission ID held/managed by it to the host computer 1. Subsequently, the second storage device 2 executes a rejection response because it has no access permission ID to be given to the access control (permission request) process 1000b from the host computer 102.

After this, the data copy process identical to the aforementioned is executed between the first storage devices 301, 302 and the second storage device 2. After this, the access control (invalidation) process 1003a is executed between the host computer 101 and the second storage device 2. After this access control (invalidation) process 1003a, for the access control (permission request) process 1000c from the host computer 102, the second storage device 2 can give the access permission ID held/managed by itself to the host computer 1.

After this, the data copy process identical to the aforementioned is executed between the first storage devices 302 and the second storage device 2. After this, the access control (invalidation) process 1003b is executed between the host computer 101 and the second storage device 2.

By executing the aforementioned processes in the present embodiment, the reserve/release control method of the present invention can be applied even when a plurality of host computer 1 execute the access control process to the second storage device 2 (concurrence present), and the same effect as the aforementioned effect can be expected.

It should be noted that in the aforementioned embodiment, the host computer 1102 rejected by the access control (permission request) process 1000b again executes the access control (permission request) process 1000c so as to acquire the access permission ID. However, the present invention is not limited to this. For example, the second storage device 2 which has returned rejection response in the access control (permission request) process 1000b notifies the host computer 102 that the access permission ID can be given after completion of the access control (invalidation) process 1003a from the host computer 101, and upon the notification, the host computer 102 can execute the access control (permission request) process 1000c.

Furthermore, in the aforementioned access control (permission request) process 1000b, instead of returning the rejection response to the host computer 102, the second storage device 2 can give the access permission ID after completion of the access control (invalidation) process 1003a from the host computer 101.

Moreover, in the aforementioned embodiment, explanation has been given on the reserve/release control method by using a single access permission ID. However, the present invention is not limited to this. It is also possible to execute the reserve/release control method by using a plurality of access permission ID's.

Description will now be directed to a second embodiment with reference to FIG. 17 to FIG. 21. It should be noted that in the second embodiment, the reserve/release control method will be explained in an example when write access requests from a plurality of first storage devices 3 to the second storage device 2 are processed by multiplexing them.

Figure 17:
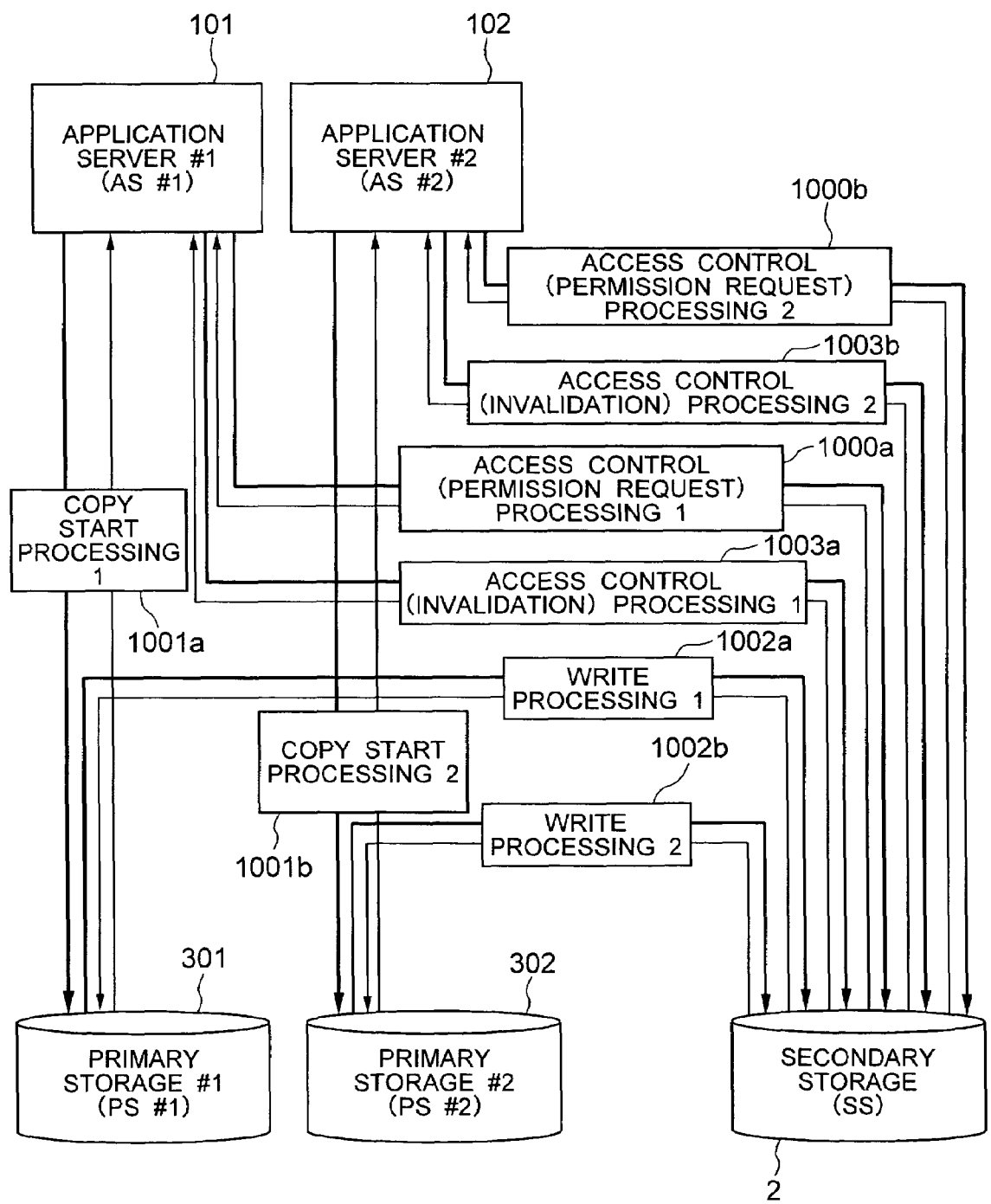
FIG. 17 shows an outline of the reserve/release control processing in the second embodiment.

FIG. 17 shows an outline of the reserve:/release control in the second embodiment. In FIG. 17, the computer system has two host computers 101 and 102. Furthermore, in the copy process started by the host computers 101, 102, the second storage device 2 can execute simultaneous processing of the write process 102 and manage a plurality of access permission ID's so as to be given simultaneously to a plurality of devices.

The host computer 101 executes the access control (permission request) process 1000a for requesting the access permission ID to the second storage device 2 and acquires the access permission ID for the second storage device 2. Similarly, the host computer 102 executes the access control (permission request) process 1000b for requesting the access permission ID to the second storage device 2 and acquires the access permission ID for the second storage device 2.

Here, the second storage device 2 manages as many as access permission ID's that can be multiplexed by itself. As a result of judgment whether simultaneous processing is possible, the second storage device 2 gives the access permission ID to a plurality of devices and can simultaneously give the access permission ID to the access control processes 1000a and 1000b.

The host computers 101, 102 which have acquired the access permission to the second storage device 2 issue a copy command added by the access permission information acquired from the second storage device 2 to the first storage devices 301, 302, thereby executing the copy start process 1 (1001a, 1001b).

The first storage devices 301, 302 which have received the copy command generate and issue a write command to the second storage device 2 according to various information constituting the copy command, thereby executing the write process 102 (1002a, 1002b). Upon termination of this write process 102, the end of the copy command is reported to the host computers 101, 102.

The host computers 101, 102 which have detected completion of the data copy (write) process from the first storage devices 301, 302 to the second storage device 2 executes an access control (invalidation) process 102 (1003a, 1003b) for requesting invalidation of the access permission ID acquired previously for the second storage device 2.

By the processing described below, it is possible to perform multiplexing of the data write accesses from a plurality of the first storage devices 301, 302 to the second storage device 2 under the reserve/release control.

FIG. 18 shows an example of the access permission management information 213 held/man aged by the second storage device 2 when accesses from the aforementioned plurality of devices are simultaneously permitted.

In FIG. 18, in the access permission management information 213, two volumes identified by Vol#1, Vol#2 are set as the volume ID 232 for identifying the volume to be access-permission-controlled. Each of the volumes includes an access permission ID 2233 notified when the access is permitted, an access object device ID 234 registered as an access object device, and an access permission ID 235 for which access permission is notified.

It should be noted that in the example of FIG. 18, "32015691" and "62303691" are set as access permission ID for the volumes identified by Vol#1, Vol#2 of the second storage device 2 and the access permission ID's are reported to the devices identified by AS#1 and AS#2. Furthermore, FIG. 18 shows that access is made from the devices identified by PS#1 and PS#2.

Figure 19:
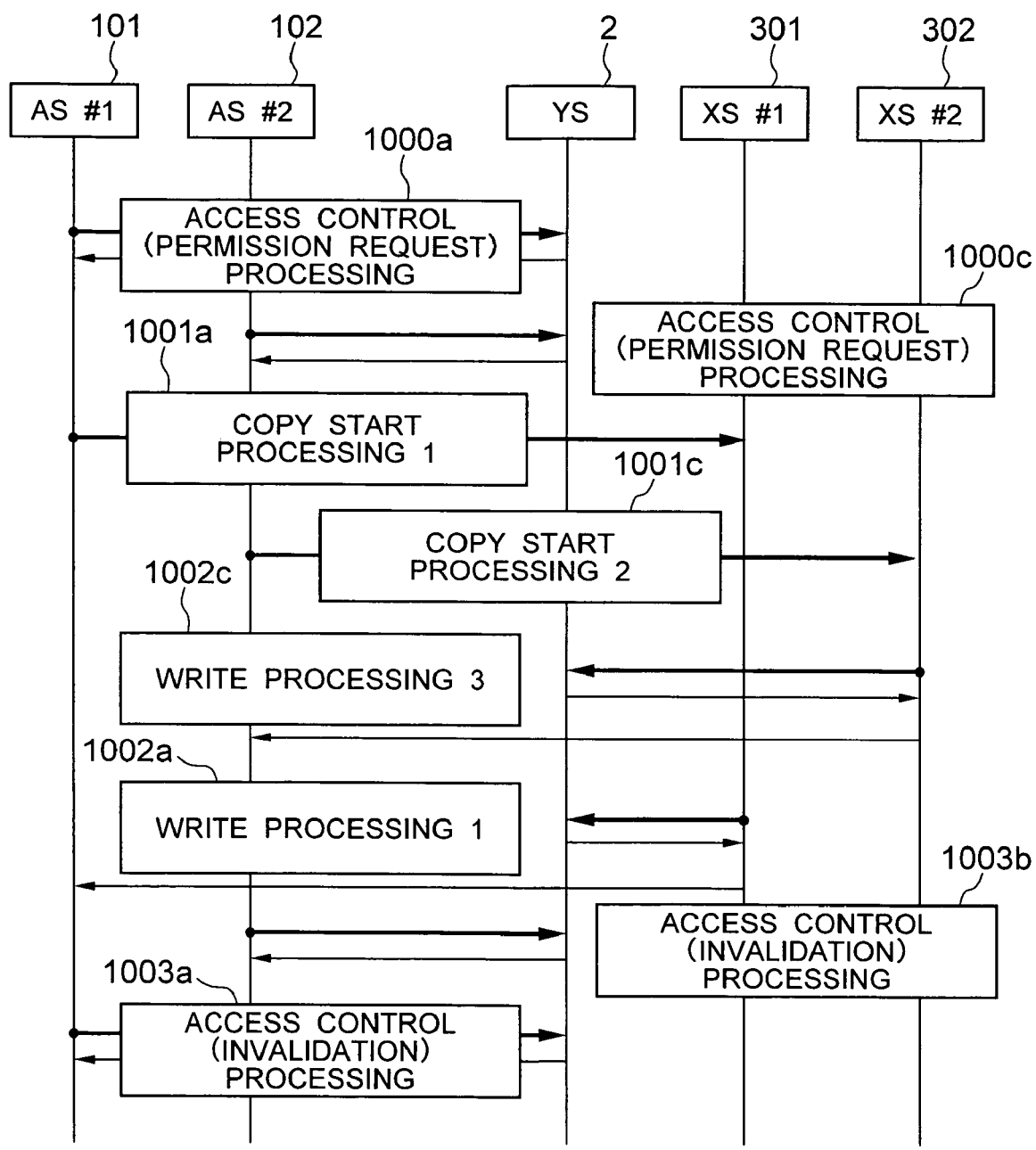
FIG. 19 shows relationship between devices for access control processing and an example of procedure in the second embodiment.

FIG. 19 shows a relationship between devices and procedures for a series of processes executing an access control processing, i.e., an access control )permission request) control 1000, a copy start process 1001, a write process 1002, and an access control (invalidation) process 1003 when a plurality of host computers 101, 102 execute an access control process (multiplexing process) to the second storage device 2.

Unlike the processing of FIG. 16, the access control (permission request) process 1000a executed from the host computer 101 to the second storage device 2 is followed by the access control (permission request) process 1000c from the host computer 102 to the second storage device in which the second storage device returns a permission response and further the write process 102 from the first storage devices 301, 302 to the second storage device 2 can be multiplexed.

In FIG. 19, the access control (permission request) process 1000a is executed between the host computer 101 and the second storage device 2 and the second storage device 2 gives (permission response) an access permission ID held/managed by itself to the host computer 101.

Subsequently, for the access control (permission request) process 1000b from the host computer 102, the second storage device 2 detects that the host computer 102 can be multiplexed with the host computer 101 to which the access ID has been already given and gives the access permission ID to the host computer 102.

Here, it is assumed that the enabled/disabled state of the multiplexing is set in advance for the second storage device 2 from the system administrator.

After this, multiplexing of the data copy process is realized by independently executing the write process 102 to the second storage device 2 from the first storage devices 301, 302 started by the host computers 101, 102. Furthermore, The access control (invalidation) processes 1003a, 1003b between the host computers 101, 102 and the second storage device 2 are also executed independently.

By executing the aforementioned processes, the second storage device 2 in the aforementioned embodiment can give (permission response) a plurality of different access permission ID's to the access control (permission request) process from a plurality of host computers 101, 102. Thus, in addition to the aforementioned effect, it is possible to improve the performance by multiplexing the copy process. For example, it is possible to expect the effect of realizing reduction of the copy process time in the host computer 1.

It should be noted that in the aforementioned embodiment, explanation has been given on a case two host computers 101, 102 executes the access permission control (permission request) process to the second storage device 2. However, the present invention is not limited to this. For example, the reserve/release control method of the present embodiment can also be applied to a case when a single host computer 101 executes a plurality of access control (permission requests) processes to the second storage device 2.

Figure 20:
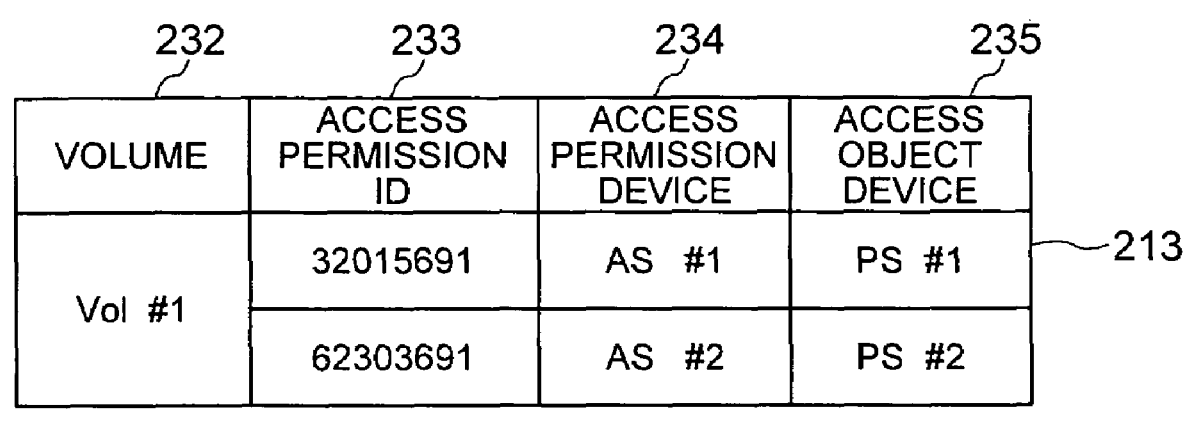

FIG. 20 shows an example of the access permission management information 2113 held/managed by the second storage device 2 when access is simultaneously permitted from the plurality of devices.

In FIG. 20, the access permission management information 213 includes a volume ID 232 for identifying the volume to be access-permission-controlled, an access permission ID 233 notified when access is permitted, an access object device ID 234 registered as an access object device, and an access permission device ID 235 for which access permission has been notified.

It should be noted that "32015691" and "62303691" are set as the access permission ID's for the volume identified by Vol#1 of the second storage volume 2. This access permission ID is notified to the device identified by AS#1 and further, access is made from the devices identified by PS#1 and PS#2.

Figure 21:
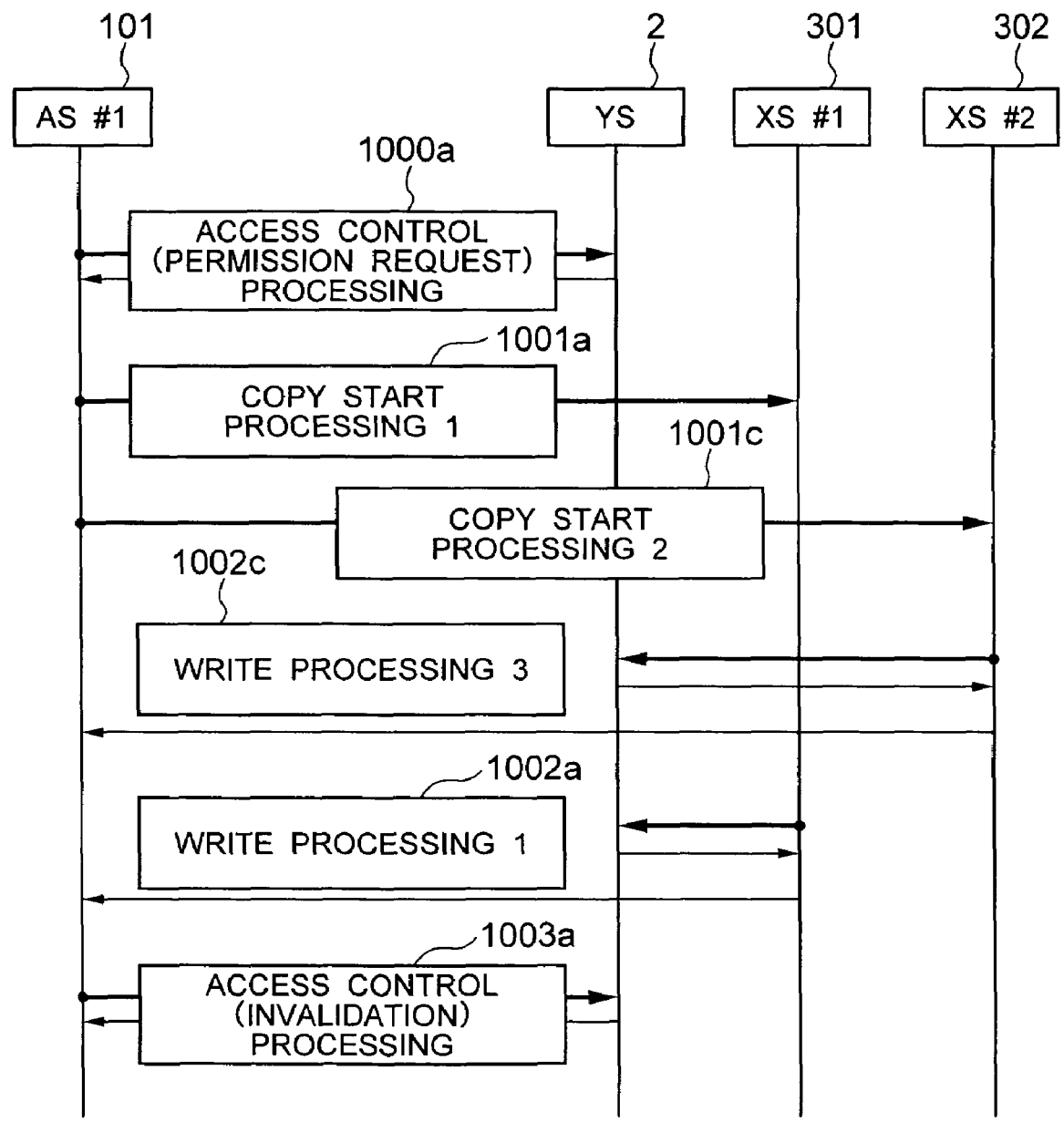
FIG. 21 shows relationship between devices for the access control processing and an example of procedure in the second embodiment.

FIG. 21 shows the relationship between devices and procedures for executing a series of processes to execute access control processing, i.e., an access control (permission request) process 1000, a copy start process 1001, a write process 1002, an access control (invalidation) process 1003 when the host computer 101 executes an access control processing to the second storage device 2 and further the host computer 101 starts a data write (copy) from the first storage devices 301, 302 to the second storage device 2 by performing multiplexing.

In FIG. 21, the access control (permission request) process 1000a is executed between the host computer 101 and the second storage device 2 and the second storage device 2 gives (permission response) two access permission ID's "32015691" and "62303691" held/managed by the second storage device 2 and permitted for the host computer (AS#1).

After this, the write process 102 is independently executed from the first storage devices 301, 302 started by the host computer 101 to the second storage device 2, thereby realizing the multiplexing of the data copy process and further executing the access control (invalidation) process 1003 between the host computer 101 and the second storage device 2.

It should be noted that the access permission ID to be added to the copy command issued from the host computer 101 to the first storage devices 301, 302 in this copy start process 102 is different from the access permission ID to be added to the write command issued from the first storage devices 301, 302 to the second storage device 2. Furthermore, the access control (invalidation) process 1003 can also be executed, for example, for each of the access permission ID's added.

By executing the aforementioned processes, the second storage device 2 of the present embodiment can give (permission response) a plurality of different access ID's from a single host computer 101 to the access control (permission request) process. Thus, in addition to the aforementioned effect, it is possible to improve the copy process by multiplexing. For example, it is possible to expect realization of reduction of time required for backup process of a plurality of backup data managed by the host computer 101.

Moreover, in the aforementioned embodiment, explanation has been given on a case that the access control process is executed between the host computer and the second storage device. However, the present invention is not limited to this.

Figure 22:
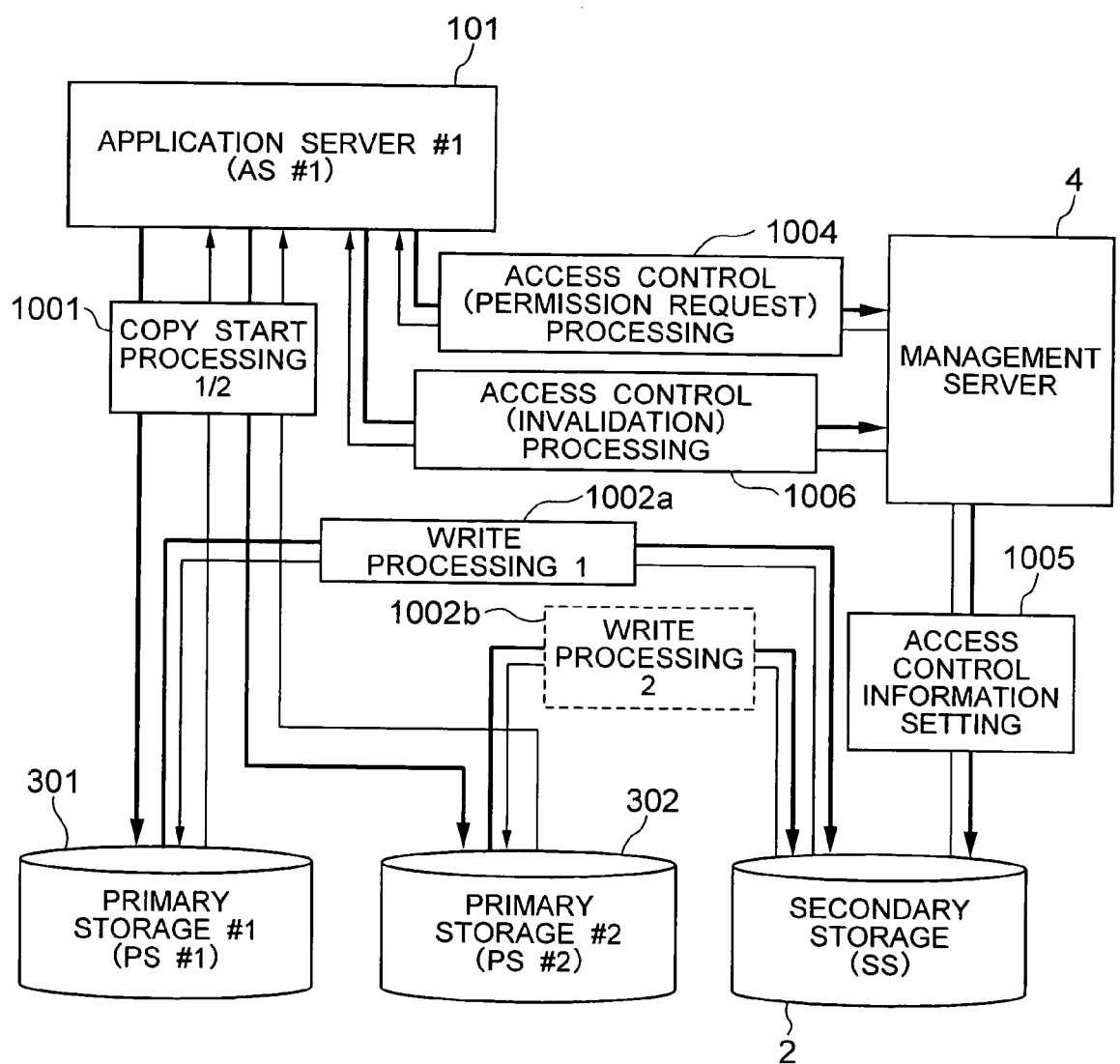
FIG. 22 shows an outline of the reserve/release control processing in the third embodiment.

Description will now be directed to a third embodiment of the present invention with reference to FIG. 22 and FIG. 23. The third embodiment explains the reserve/release control method of the present invention in an example where access control to the second storage device 2 is realized via a management device 4.

FIG. 22 shows an outline of the reserve/release control processing in the third embodiment. In FIG. 22, before the host computer 101 starts copying data in the second storage device 2 from the first storage devices 301, 302 by using the copy command, the host computer 101 executes access control (permission request) process 1004 requesting the management device 4 to give an access permission ID and acquires the access permission ID from the management device 4.

It should be noted that in the management device 4, before transmission (permission response) of the access permission ID to the host computer 101, the access permission management information is set 1005 in the second storage device 2.

Moreover, the host computer 101 executes an access control (invalidation) process 1006 requesting invalidation of the access permission ID acquired previously, to the management device 4. The management device 4 sets the access permission management information 1005 in the second storage device 2.

It should be noted that here "setting of the access permission management information" means registration and updating of the access permission ID 233 of the access permission management information 213 held/managed by the second storage device 2. For example, registration of the access permission ID given in the access control (permission request process 1004 and deletion/setting of the access permission ID invalidated in the access control (invalidation) process 1006. The aforementioned processes are identical to the processes explained with reference to FIG. 6 and their explanation is omitted.

FIG. 23 shows an example of access permission management information 413 held/managed by the management device 4. In FIG. 23, the access permission management information 413 includes device ID information 431 identifying a device to be access-permission-controlled and a volume, a volume ID 432, access permission ID 433 notified when access is permitted, and access permission device ID 434 identifying a device permitted.

It should be noted that in the example of FIG. 23, the management device 4 manages the volumes identified by Vol#1, Vol#2, Vol#3 of the device identified by SS#1 and the volume identified by Vol#1 of the device identified by SS#2 as access permission control objects and manages the access permission ID and the access permission device ID for each volume in this example.

By executing the aforementioned processes, it is possible to realize the access control for the second storage device 2 via the management device 4, to prevent increase of the processing load in the second storage device 2, and expect the same effect as the aforementioned. It should be noted that the access command to the second storage device can be transmitted not only by the storage device but also by the computer.

According to the present invention, even when the device to be accessed for the target device such as a storage device shared-accessed is modified, the host computer as a privileged device can easily perform reserve/release control by adding the access permission ID acquired from the target device, to the access request for the object to be accessed. Thus, as compared to the conventional case, it is possible to reduce the protocol overhead for switching process of the access permission right by the privileged device, thereby improving the computer system performance. Since the target device judges access permission by using the access request source device ID and access permission ID, it is possible to expect improvement of reliability of the data access. For example, it is possible to prevent access by an unauthorized person.

Furthermore, the target device gives a plurality of access permission ID's, thereby enabling multiplexing of accesses to the target device and improving the computer system performance. Moreover, for accesses from a plurality of privileged host computers, the target device can control the accesses by giving a plurality of different access permission ID's, thereby performing multiplexing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A reserve/release control method for a target device accessed by a first host computer, the method comprising steps of:

managing an access permission ID for identifying access permission to a local device of the target device;

transmitting the access permission ID to the first host computer when permitting an access permission request received from the first host computer;

judging whether to grant access in response to an access request from a first device by using the access permission ID which was added to the access request, and which was transmitted in response to the access permission request from the first host computer, wherein the target device and the first device are storage devices accessed from a plurality of host computers, and the target device manages a plurality of access permission IDs, wherein the target device gives different access permission IDs to each of a plurality of access permission requests from the plurality of host computers and transmits the access permission IDs to the host computers;

updating the access permission ID in the target device;

updating the access permission ID held for the local device when a request for invalidating the access permission ID is received from the first host computer for which the access permission request has been permitted;

issuing, by the first host computer, an access permission request to the target device prior to issuing of the access request to the target device by the first device; and acquiring by the target device the access permission ID which was added to the access request when the target device determines whether to permit the access request from the first device.

2. A reserve/release control method according to claim 1, further comprising a step of issuing, by the first host computer, an access command having added thereto the access permission ID acquired in advance when the first host computer issues the access command to the first device.

3. A reserve/release control method for a target device accessed by a host computer, in which a system including the target device includes a plurality of first storage devices, including said first device, functioning as clients which receive and execute an access command from the host computer and a second storage device functioning as the target device, the method comprising steps of:

managing an access permission ID for identifying access permission to a local device of the target device;

transmitting the access permission ID to the host computer when permitting an access permission request received from the host computer;

judging whether to grant access in response to an access request from a first device by using the access permission ID which was added to the access request, and which was transmitted in response to the access permission request from the host computer;

issuing, by the host computer, a copy command having added thereto the access permission ID acquired from the second storage device to the first storage device; and executing, by the first storage device, the copy command as the access request to the second storage device, and transmitting the data stored in the first storage device to the second storage device for which access is permitted by the access permission ID.

4. A system comprising:

a first device; a second device connected to the first device via a network; wherein the first device and the second device are storage devices;

a management device connected to the network; and a host computer connected to the first and the second device via the network, wherein the host computer issues an access permission request to the second device prior to issuing an access command to the first device and issues the access command to the first device by including an access permission ID for identifying the access permission acquired when the access permission request is permitted, wherein the second device manages the access permission ID for identifying the access permission to the second device and, when permitting the access permission request from the host computer, gives the access permission ID to the host computer and judges the access permission by using the access permission ID added to an access request from the first device resulting from the access command from the host computer, wherein the first device executes a process of accessing the second device according to the access command from the host computer, and wherein the management device executes registration, deletion, and updating of the access permission ID managed by the second device.

5. A system comprising:

a first device;

a second device connected to the first device via a network, and a host computer connected to the first and the second device via the network.

wherein the host computer issues an access permission request to the second device prior to issuing an access command to the first device and issues the access command to the first device by including an access permission ID for identifying the access permission acquired when the access permission request is permitted, wherein the second device manages the access permission ID for identifying the access permission to the second device and, when permitting the access permission request from the host computer, gives the access permission ID to the host computer and judges the access permission by using the access permission ID added to an access request from the first device resulting from the access command from the host computer, wherein the first device executes a process of accessing the second device according to the access command from the host computer, wherein the host computer consists of a plurality of host computers executing an application program, wherein the first device is a primary storage having a first recording medium for storing data, wherein the second device is a secondary storage having a second recording medium for storing copy data, said copy data being a copy of the data stored in the first recording medium of the first device wherein the host computer issues as the access command a copy command having added thereto the access permission ID acquired from the secondary storage to the primary storage, and wherein the primary storage executes the copy command, thereby transmitting data to the secondary storage.

6. A system comprising:

a first device;

a second device connected to the first device via a network, and a host computer connected to the first and the second device via the network, wherein the host computer issues an access permission request to the second device prior to issuing an access command to the first device and issues the access command to the first device by including an access permission ID for identifying the access permission acquired when the access permission request is permitted.

wherein the second device manages the access permission ID for identifying the access permission to the second device and, when permitting the access permission request from the host computer, gives the access permission ID to the host computer and judges the access permission by using the access permission ID added to an access request from the first device resulting from the access command from the host computer, wherein the first device executes a process of accessing the second device according to the access command from the host computer, wherein the host computer consists of a plurality of host computers executing an application program, wherein the first device is a primary storage having a first recording medium for storing data, wherein the second device is a secondary storage having a second recording medium for storing copy data, said copy data being a copy of the data stored in the first recording medium of the first device, wherein the host computer issues as the access command a copy command having added thereto the access permission ID acquired from the secondary storage to the primary storage, wherein the primary storage executes the copy command, thereby transmitting data to the secondary storage, and wherein when data copy from the primary storage to the secondary storage is complete, the host computer executes an access control process requesting the secondary storage to invalidate the access permission ID acquired previously.

7. A system comprising:

a first device:

a second device connected to the first device via a network, and a host computer connected to the first and the second device via the network, wherein the host computer issues an access permission request to the second device prior to issuing an access command to the first device and issues the access command to the first device by including an access permission ID for identifying the access permission acquired when the access permission request is permitted, wherein the second device manages the access permission ID for identifying the access permission to the second device and, when permitting the access permission request from the host computer, gives the access permission ID to the host computer and judges the access permission by using the access permission ID added to an access request from the first device resulting from the access command from the host computer, wherein the first device executes a process of accessing the second device according to the access command from the host computer, wherein the host computer consists of a plurality of host computers executing an application program, wherein the first device is a primary storage having a first recording medium for storing data, wherein the second device is a secondary storage having a second recording medium for storing copy data, said copy data being a copy of the data stored in the first recording medium of the first device, wherein the host computer issues as the access command a copy command having added thereto the access permission ID acquired from the secondary storage to the primary storage, and wherein the primary storage executes the copy command, thereby transmitting data to the secondary storage, wherein a plurality of volumes as logical storage units are formed on the first and second recording mediums; and wherein the host computer holds as access permission management information, information indicating the second device as an access permission control object, a volume ID for identifying a volume for which access permission is controlled, an access permission ID notified when access is permitted, an ID of the first device as an access object for identifying the first device which has issued the access request to the second device.

8. A system comprising:

a first device;

a second device connected to the first device via a network, and a host computer connected to the first and the second device via the network, wherein the host computer issues an access permission request to the second device prior to issuing an access command to the first device and issues the access command to the first device by including an access permission ID for identifying the access permission acquired when the access permission request is permitted, wherein the second device manages the access permission ID for identifying the access permission to the second device and, when permitting the access permission request from the host computer, gives the access permission ID to the host computer and judges the access permission by using the access permission ID added to an access request from the first device resulting from the access command from the host computer, wherein the first device executes a process of accessing the second device according to the access command from the host computer, wherein the host computer consists of a plurality of host computers executing an application program, wherein the first device is a primary storage having a first recording medium for storing data, wherein the second device is a secondary storage having a second recording medium for storing copy data, said copy data being a copy of the data stored in the first recording medium of the first device, wherein the host computer issues as the access command a copy command having added thereto the access permission ID acquired from the secondary storage to the primary storage, and wherein the primary storage executes the copy command, thereby transmitting data to the secondary storage, wherein a plurality of volumes as logical storage units are formed on the first and second recording mediums, and wherein the first device holds as access permission management information, an ID for identifying the second device as the access permission control object, a volume ID for identifying a volume for which access permission is controlled, an access permission ID notified when access is permitted, and an ID for identifying the host computer which has notified the access permission ID to the first device.

9. A system comprising:
a first device;
a second device connected to the first device via a network, and
a host computer connected to the first and the second device via the network,
wherein the host computer issues an access permission request to the second device prior to issuing an access command to the first device and issues the access command to the first device by including an access permission ID for identifying the access permission acquired when the access permission request is permitted,
wherein the second device manages the access permission ID for identifying the access permission to the second device and, when permitting the access permission request from the host computer, gives the access permission ID to the host computer and judges the access permission by using the access permission ID added to an access request from the first device resulting from the access command from the host computer,
wherein the first device executes a process of accessing the second device according to the access command from the host computer,
wherein the host computer consists of a plurality of host computers executing an application program,
wherein the first device is a primary storage having a first recording medium for storing data,
wherein the second device is a secondary storage having a second recording medium for storing copy data, said copy data being a copy of the data stored in the first recording medium of the first device,
wherein the host computer issues as the access command a copy command having added thereto the access permission ID acquired from the secondary storage to the primary storage, and
wherein the primary storage executes the copy command, thereby transmitting data to the secondary storage
wherein a plurality of volumes as logical storage units are formed on the first and second recording mediums, and
wherein the second device holds as access permission management information, a volume ID for identifying a volume as an access permission control object, an access permission ID notified when access is permitted, and an ID of the first device registered as a device to be permitted access, and an ID for identifying the host computer which has been notified of the access permission ID.

10. A storage system comprising:
a first storage device connected via a network to a host computer; and
a second storage device connected to the host computer and to the first storage device,
wherein the first storage device comprises:
a first memory for storing a first command processing program for processing an access command from the host computer;
a first CPU for executing the first command processing program; and
a first recording medium having a plurality of first volumes formed as logical storage units for storing data,
wherein the second storage device comprises:
a second memory for storing a second command processing program for processing an access request from the first storage device, and an access permission control program executing access permission control processing to the host computer prior to processing of the access request from the first storage device and updating an access permission ID according to a processing result;
a second CPU for executing the second command processing program and the access permission control program; and
a second recording medium having a plurality of second volumes formed as logical storage units for storing data,
wherein the second memory of the second storage device holds access management information including a volume ID for identifying a target volume to be access-permission-controlled, the access permission ID notified when the access is permitted, an ID of the first storage device registered as a first device to be permitted accessed, and an ID of an access permission device identifying a device to which the access permission ID is notified,
when the host computer issues to the first storage device a copy command having added thereto access permission management information acquired from the second storage device,
wherein the first CPU of the first storage device executes the copy command from the host computer and performs processing for transferring the data stored in the recording medium to the second storage device,
wherein the second CPU of the second storage device manages the access permission ID for identifying the access permission to the second CPU itself and when the second CPU permits the access permission request from the host computer, the second CPU gives the access permission management information to the host computer, performs access permission judgment by using the access permission ID included with the access request from the first storage device resulting from the access command from the host computer, and executes processing for storing data transferred from the first storage device to the second recording medium.

* * * * *